UNITED STATES PATENT OFFICE.

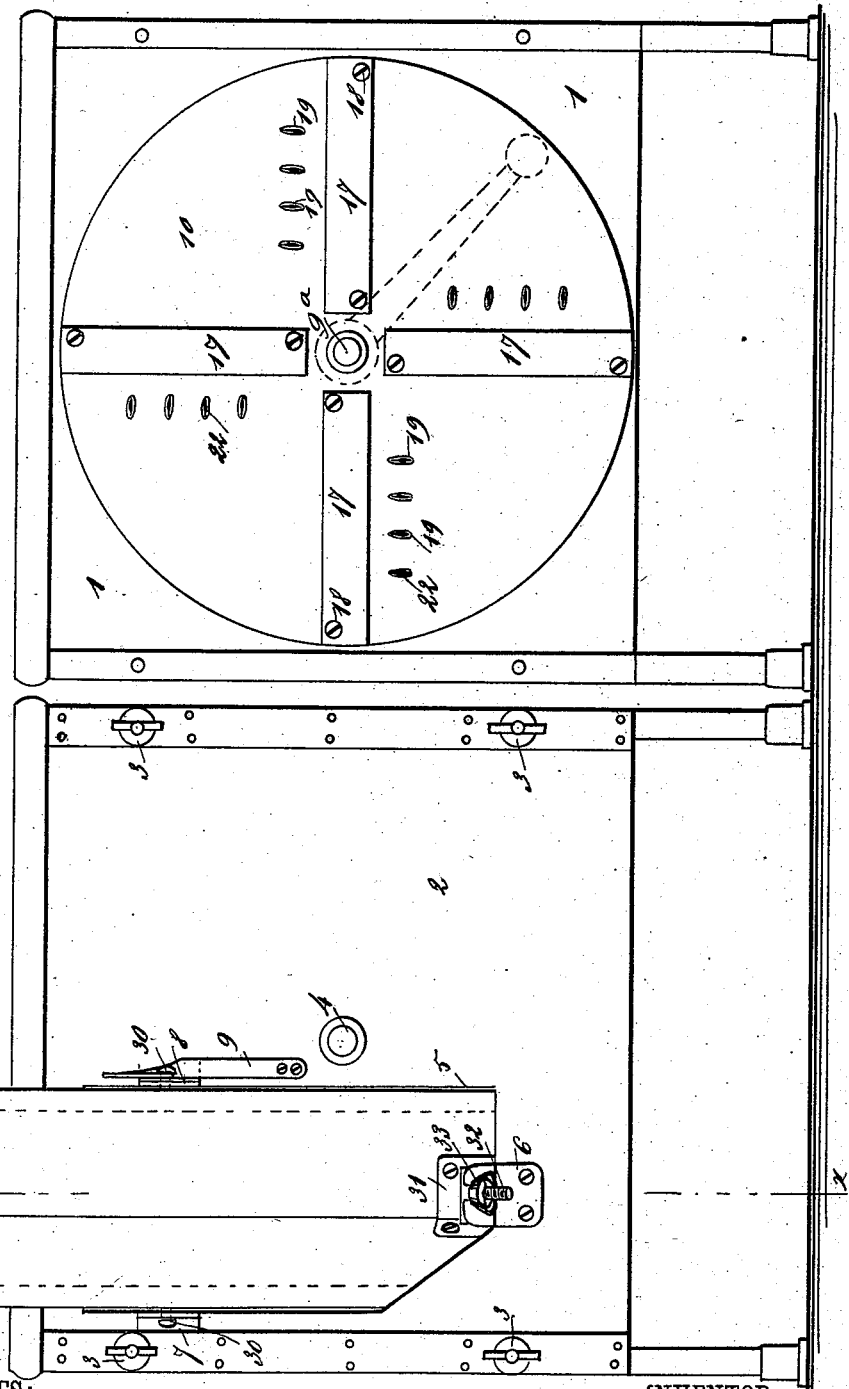

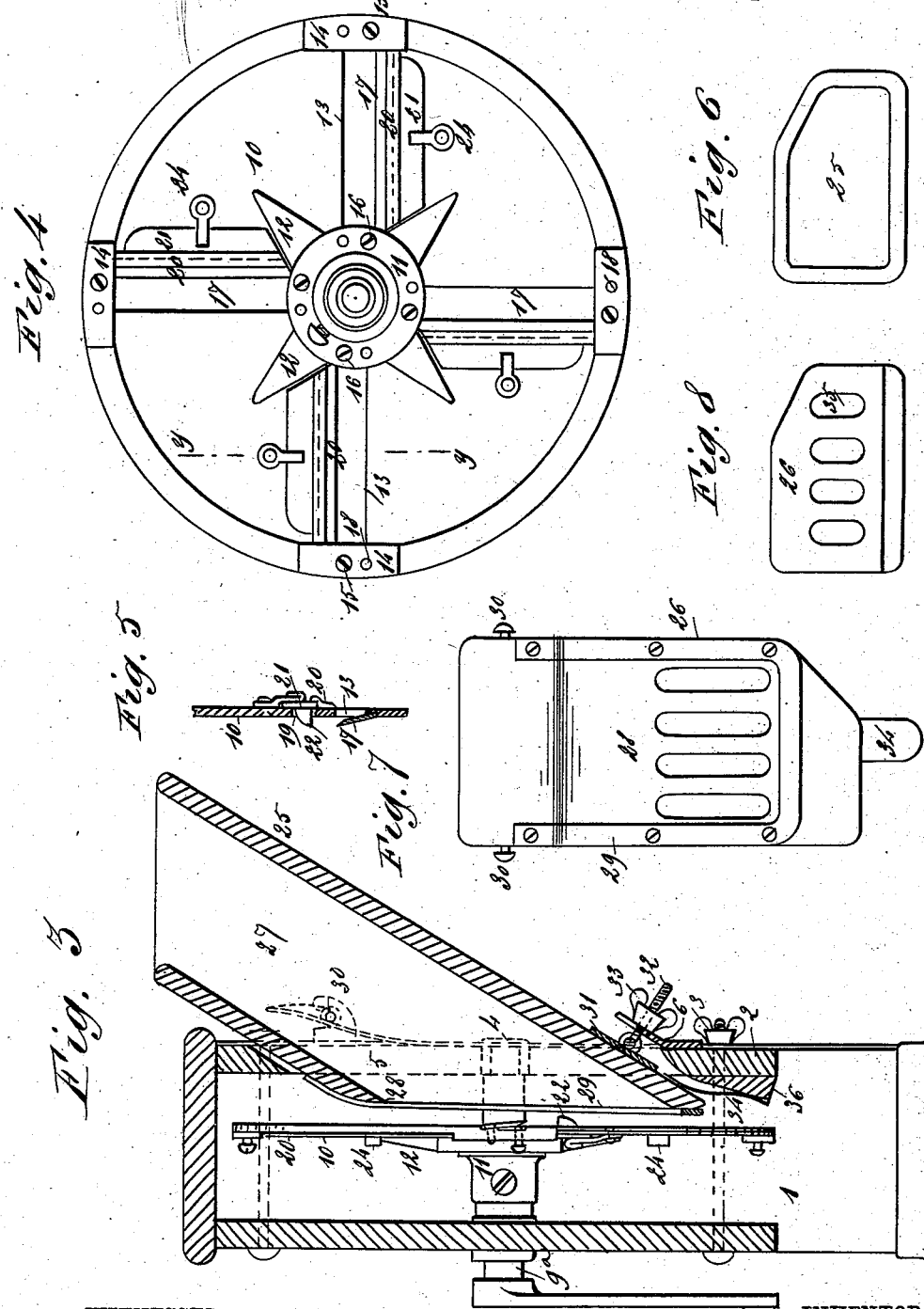

ANTHONY LETHERT, OF JORDAN, MINNESOTA, ASSIGNOR TO HIMSELF AND MICHAEL GEIS, OF SAME PLACE.

VEGETABLE-CUTTER.

SPECIFICATION forming part of Letters Patent No. 381,261, dated April 17, 1888.

Application filed August 31, 1887. Serial No. 248,369. (No model.)

*To all whom it may concern:*

Be it known that I, ANTHONY LETHERT, of Jordan, in the county of Scott and State of Minnesota, have invented a new and Improved Vegetable-Cutter, of which the following is a full, clear, and exact description.

My invention consists in an improved vegetable cutter, and has for its object to provide a machine whereby vegetables of all kinds may be cut in slices and the said slices cross-cut, if desired, in a convenient, speedy, and efficient manner, and wherein the machine will be simple and durable in construction and capable of being manufactured at a minimum cost.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a front elevation of the machine; Fig. 2, a front elevation with the frontispiece removed, displaying the front side of the cutting-disk; Fig. 3, a transverse section on line *x x* of Fig. 1; Fig. 4, a rear view of the detached cutting-disk; Fig. 5, a section on line *y y* of Fig. 4; Fig. 6, a plan view of the hopper employed in feeding large vegetables; Fig. 7, a rear elevation of a substitute hopper for small vegetables, and Fig. 8 a plan view of the same.

In carrying out the invention a box or casing, 1, is provided, having a detachable front side, 2, secured in position by a series of set-screws, 3, as illustrated in Fig. 1. The detachable front is provided centrally with a circular bearing, 4, and at one side of said bearing with a substantially rectangular aperture, 5. At the bottom of said aperture a plate, 6, is attached, having a slotted upper end, which end is adapted to project outward at an angle from the edge of the aperture, as shown in Fig. 3. Near the top of the aperture, at each side, horizontal ears 7 and 8 are secured, having a slot, and below the ear 8 a spring-catch, 9, is fastened, which catch, extending upward beyond the ear, is limited in its outward movement by a suitable stop integral with said ear 8. A spindle, $9^a$, is journaled transversely in the casing, one end revolving in the aforesaid bearing 4 in the detachable front, and the other end in suitable bearings located in the back. Upon the spindle $9^a$ a cutting disk, 10, is secured by a set-screw passing through the hub 11 to a contact with the spindle, or by other suitable means, the said hub being prominent upon the back of the disk only, where it is provided with integral radial angular arms 12, attached to the disk to strengthen and stiffen the same, as shown in Fig. 4.

Between the radial arms of the hub, which are preferably four in number, rectangular recesses 13 are produced in the disk 10, extending out through the periphery of the disk, each of the said recesses being so positioned in the disk as to substantially divide the same in quarters.

Upon the rear side of the disk at its periphery blocks 14 are made to span the various recesses 13, into which blocks a set-screw, 15, is entered above one longitudinal edge of the recess, and a similar and aligning screw, 16, is screwed into and through the hub.

Upon the front side of the disk a cutting-blade, 17, is placed in each recess 13, held in position by screws or bolts 18 at each end near its upper edge, the said screws passing, respectively, into the hub 11 and blocks 14, as shown in Figs. 2 and 4. Each blade 17 is given an inclination outward from the front of the disk, and said inclination is adjusted by the aforesaid set-screws 15 and 16 in the blocks 14 and hub, the said set-screws being adapted to bear against the under sides of the blades at each end. It will be observed that the blades are readily detachable for sharpening, cleaning, or renewal, and that they are adjustable at an inclination from the disk in a simple and convenient manner.

Below the cutting-edge of each knife a series of elongated apertures, 19, are made in the disk, and upon the rear face of the disk, above the apertures 19 and below the recesses 13, a grooved projection, 20 is produced, extending from the hub 11 to the blocks 14, and in the groove of the said projections one longitudinal edge of a plate, 21, is entered, carrying a series of integral cutters, 22, so spaced as to readily enter and project out from the several apertures 19 upon the front face of the disk, the spaced cutters 22, as will be observed by reference to Fig. 2, occupying a position at right angles to the cutting-blades 17.

The cutter-carrying plates are held in position by a button, 24, pivoted centrally below each plate and adapted to clamp the same, as shown in Fig. 4.

In the operation of the machine two styles of feeding-boxes are employed, one box, 25, for use with cabbages, rutabaga turnips, and other large vegetables, and the other box, 26, for use with small vegetables, such as beans, carrots, and parsnips. The box 25 is provided with a clear opening, 27, from end to end, having its inner side from a point near the center beveled downward and outward to the base, as shown at 28 in Fig. 3, and the edges of said beveled portion are bound with a metal strip, 29. The bevel and strip are features common to both forms of boxes. Upon opposing sides of each box pins 30 are secured, and centrally the lower end upon the outside a plate, 31, is secured, upon which plate is pivoted a screw, 32, carrying a winged nut, 33. Below the plate 31 an outwardly-curved spring, 34, is fastened. The feed-box 26 only differs from the feed-box 25 in that, instead of having one continuous passage from end to end, a series of small passages, 35, is provided.

In placing the feed-boxes in position they are entered in the aperture 5 in the detachable front and the spring 34 is made to bear on a convex projection, 36, upon the inner side of said front immediately below the aperture, and the pins 30 are entered in the slotted ears 7 and 8 and are secured in position by the spring-catch 9. The metal band 29 will now be rather close to the cutters. A proper adjustment of the distance, which is partially regulated by the thickness of the slice to be cut, is effected by entering the pivoted screw in the slot of the plate 6 and screwing up the nut 33 against said plate.

In operation, if cabbages are to be cut, the cutters 22 are removed and the knives 17 only are allowed to remain. If, however, turnips are to be cut, or similar vegetables, the small knives or cutters are inserted in their respective apertures in the disk. Thus, when the disk is revolved, the cutters slice the vegetables one way and the knives following cut them at an angle to the first cut.

Having thus described my invention, what I claim as new, and desire to secure by Letters Patent, is—

1. In a vegetable-cutter, the combination, with a frame having an apertured front and a slotted angular plate below said aperture, of a feed-box provided with a spring resting upon the inner side of the front below the aperture and a screw pivoted at the base of the feed-box and carrying a thumb-nut adapted to bear upon said slotted angular plate, said feed-box being connected to the frame at the top, substantially as specified.

2. In a vegetable-cutter, the combination, with a frame having an apertured front and a slotted angular plate below said aperture, of a feed-box provided with a spring resting upon the inner side of the front below the aperture and with pins resting or fitting in slotted ears held upon the said front, a spring secured to said front and holding said pins in said ears, and a screw pivoted at the base of the front of said box and carrying a thumb-nut adapted to bear upon said slotted angular plate, substantially as set forth.

3. In a vegetable-cutter, the combination, with a frame having an apertured front and a slotted angular plate held below said aperture, a spindle journaled in said frame, and a revoluble disk keyed upon said spindle, carrying knives, of a feed-box adapted for insertion in the aperture of said front, provided with a spring engaging the inner side of the front below the aperture, and a screw pivoted at the base carrying a thumb-nut adapted to engage the said slotted angular plate at the top.

4. In a vegetable-cutter, the knife-carrying disk provided adjacently to one set of its knives or cutters with a series of spaced apertures below the cutting-edges of said knives or cutters, a grooved projection between the apertures and the knives, additional cutters projecting through said apertures, a plate carrying said cutters and held in said grooved projection, and buttons applied to said disk and engaging said plates, substantially as set forth.

5. In a vegetable-cutter, the combination, with a frame having a detachable face, a spindle journaled in said frame, and a feeder detachably and adjustably secured to the frame, of a disk keyed upon the shaft, provided with a hub, 11, integral with its rear side, recesses 13, blocks 14, spanning said recesses at the outer ends, knives held in said recesses, adjusted by set-screws 15 and 16, a series of spaced apertures, 19, below the cutting-edges of the knives, a grooved projection between the apertures and the knives, cutters 22, projecting through said apertures, a plate, 21, carrying said cutters, held in said grooved projections, and buttons 24, engaging said plates, substantially as shown and described.

ANTHONY LETHERT.

Witnesses:
F. HERMAN JUERGENS,
FRANK HEUSE.